(12) United States Patent
Drake et al.

(10) Patent No.: US 7,797,918 B2
(45) Date of Patent: Sep. 21, 2010

(54) MOWER WITH FLIP UP ARMREST CARRYING OPERATIONAL CONTROLS AND DISPLAY

(75) Inventors: Jeffrey T. Drake, Richfield, MN (US); Gordon R. Schmidt, Farmington, MN (US); Malachy P. Fay, Eden Prairie, MN (US)

(73) Assignee: The Toro Company, Bloomington, MN (US)

( * ) Notice: Subject to any disclaimer, the term of this patent is extended or adjusted under 35 U.S.C. 154(b) by 728 days.

(21) Appl. No.: 11/319,007

(22) Filed: Dec. 27, 2005

(65) Prior Publication Data

US 2007/0144133 A1 Jun. 28, 2007

(51) Int. Cl.
*A01D 67/04* (2006.01)
(52) U.S. Cl. ............... 56/323; 180/315; 297/411.32
(58) Field of Classification Search ............. 56/1, 56/10.1, 10.8, 14.7, 323; 180/315–332; 297/411.32
See application file for complete search history.

(56) References Cited

U.S. PATENT DOCUMENTS

| | | | | |
|---|---|---|---|---|
| 3,456,430 A | * | 7/1969 | Maloney | 56/12.8 |
| 3,580,636 A | * | 5/1971 | Setto | 297/411.32 |
| 4,366,881 A | | 1/1983 | Frisbee | |
| 4,478,308 A | | 10/1984 | Klaassen | |
| 4,702,520 A | * | 10/1987 | Whisler et al. | 297/411.36 |
| 4,828,323 A | * | 5/1989 | Brodersen et al. | 297/411.36 |
| 4,848,840 A | * | 7/1989 | Toya | 297/411.32 |
| 4,973,017 A | * | 11/1990 | Takagi | 248/292.13 |
| 5,116,099 A | * | 5/1992 | Kwasnik et al. | 297/188.15 |
| 5,406,778 A | * | 4/1995 | Lamb et al. | 56/7 |
| 5,489,143 A | * | 2/1996 | Adachi et al. | 297/411.38 |
| 5,566,778 A | * | 10/1996 | Valier et al. | 180/334 |
| 5,702,157 A | * | 12/1997 | Hurite | 297/411.38 |
| 5,743,595 A | * | 4/1998 | Kirdulis | 297/411.38 |
| 5,860,488 A | * | 1/1999 | Kim | 180/271 |
| 5,924,515 A | * | 7/1999 | Stauffer | 180/326 |
| 5,941,603 A | * | 8/1999 | Wein | 297/411.35 |
| 6,039,141 A | * | 3/2000 | Denny | 180/329 |
| 6,050,645 A | * | 4/2000 | Bradbury | 297/411.38 |
| 6,112,139 A | | 8/2000 | Schubert et al. | |
| 6,148,688 A | | 11/2000 | Nishimaki | |
| 6,164,285 A | * | 12/2000 | Garberg et al. | 180/326 |

(Continued)

*Primary Examiner*—Thomas B Will
*Assistant Examiner*—Mai T Nguyen
(74) *Attorney, Agent, or Firm*—James W. Miller (57) ABSTRACT

A riding mower has a frame supported by a plurality of wheels including a pair of front drive wheels covered by front fenders. A plurality of cutting units are arranged in advance of the frame. The operator sits on a seat atop the frame at the front of the frame. The operator mounts and dismounts the seat from behind the front fenders and the front wheel and not from the front, access to the seat from the front being prevented by the placement of the cutting units. A pivotal armrest along one side of the seat normally blocks access to the seat from that side. However, the armrest can be pivoted to a raised position in which it clears the seat to allow the operator to reach the seat from that side of the seat. The armrest carries a lift and lower control for lifting and lowering the cutting units and a start/stop control for starting and stopping the operation of the cutting units, the operational controls moving with the armrest as the armrest moves between its lowered operational position and its raised position.

16 Claims, 6 Drawing Sheets

U.S. PATENT DOCUMENTS

| | | | |
|---|---|---|---|
| 6,189,964 B1 * | 2/2001 | Henshaw et al. | 297/112 |
| 6,351,929 B1 * | 3/2002 | Gust et al. | 56/7 |
| 6,352,133 B1 | 3/2002 | Ojima | |
| 6,450,284 B1 * | 9/2002 | Sakyo et al. | 180/329 |
| 6,746,067 B2 * | 6/2004 | Schmidt et al. | 296/37.13 |
| 6,904,995 B2 | 6/2005 | Dinkel et al. | |
| 7,014,255 B2 * | 3/2006 | Amamiya et al. | 296/190.08 |
| 7,018,158 B2 * | 3/2006 | Amamiya et al. | 414/636 |
| 7,032,703 B2 * | 4/2006 | Wulfert et al. | 180/329 |
| 7,165,472 B2 * | 1/2007 | Jo et al. | 74/524 |
| 7,290,635 B2 * | 11/2007 | Bisick et al. | 180/272 |
| 2005/0133292 A1 * | 6/2005 | Ginzel et al. | 180/315 |

* cited by examiner

MOWER WITH FLIP UP ARMREST CARRYING OPERATIONAL CONTROLS AND DISPLAY

TECHNICAL FIELD

This invention relates to a mower for cutting grass. More particularly, this invention relates to a riding mower that is controlled by a seated operator who is carried at an operator's station provided on the mower.

BACKGROUND OF THE INVENTION

Riding lawn mowers are well known in the turf care industry for performing a turf maintenance operation, namely for cutting grass. Such lawn mowers carry one or more suitable grass cutting units. The grass cutting units are vertically movable between a lowered grass cutting position and a raised transport position. The grass cutting units are also capable of selective operation, namely they can be started and stopped, at the discretion of the operator.

A riding lawn mower carries an operator who sits on a seat at an operator's station. The operator is responsible for the safe operation of the mower. The operator must drive the mower by manipulating various drive controls that determine the speed and direction of movement of the vehicle. These drive controls often comprise a steering wheel along with traction and brake pedals provided on the mower. The drive controls are usually placed on a floorboard in advance of the operator's seat.

In addition to the mower, the operator must also operate the cutting units carried on the mower. This comprises moving the cutting units into and out of engagement with the ground and selectively starting and stopping the operation of the cutting units. This is done using various operational controls that are separate from the steering wheel and the traction and brake pedals.

In many prior art riding mowers, the operational controls are provided in a fixed control console located along one side of the operator's seat. These operational controls are manipulated by one hand of the user while the user continues to grip the steering wheel with his or her other hand and continues to operate the traction and brake controls using his or her feet. These operational controls typically include an on/off switch for starting and stopping the cutting units, a lift and lower control for raising and lowering the cutting units, a throttle for varying the engine speed of the mower, a light switch, and a key switch.

One problem with the way the operational controls are configured in current riding mowers is that it restricts how the operator can mount or dismount the mower. The operator cannot step over the fixed control console that mounts the operational controls. Thus, the operator can mount or dismount only from the other side of the mower, namely the side of the operator's station that does not carry the fixed control console. Alternatively, the operator's station must include enough room in front of the fixed control console and between the steering and traction and brake controls that the operator can mount from in front of the fixed control console. In either case, how the operator mounts is restricted to only one side of the mower or the design of the mower is restricted by forcing the designer to leave enough space ahead of the fixed control console.

SUMMARY OF THE INVENTION

One aspect of this invention relates to a mower which comprises a frame supported for movement over the ground by a plurality of wheels. At least some of the wheels are driven to self-propel the frame over the ground. at least one cutting unit is carried on the frame for mowing grass. An operator's station is provided on the frame, the operator's station having a seat for carrying a seated operator. Drive controls are provided for controlling the speed and direction of movement of the frame over the ground. The drive controls are arranged in advance of the seat. An armrest is carried adjacent one side of the seat. The armrest carries operational controls for controlling operation of the cutting unit(s). The armrest is pivotally carried on the frame for movement between a lowered operational position in which ingress to and egress from the seat is blocked by the armrest and a flipped up, raised position in which ingress to and egress from the seat is not restricted.

Another aspect of this invention relates to a mower which comprises a frame supported for movement over the ground by a plurality of wheels. At least some of the wheels are driven to self-propel the frame over the ground. At least one cutting unit is carried on the frame for mowing grass. An operator's station is provided on the frame, the operator's station having a seat for carrying a seated operator. An armrest is carried adjacent one side of the seat. The armrest is pivotally carried on the frame for movement between a lowered operational position in which ingress to and egress from the seat is blocked by the armrest and a flipped up, raised position in which ingress to and egress from the seat is permitted. A latch is carried on the frame and abuts with the armrest when the armrest is in its lowered operational position for establishing an angle of inclination of the armrest relative to horizontal.

Yet another aspect of this invention relates to a mower which comprises a frame having a front end and a rear end. The frame is supported by a pair of drive wheels at the front end and at least one wheel at the rear end, the drive wheels each being at least partially covered by a front fender. A seat carries a seated operator with the seat being arranged generally between the front wheels and the front fenders. A floorboard extends forwardly of the seat. A steering wheel is arranged on the frame above the floorboard and in advance of the seat and traction and brake pedals are carried on the floorboard in advance of the seat. A plurality of cutting units are carried on the frame forwardly of the front end of the frame and forwardly of the drive wheels and the front fenders, the cutting units being arranged relative to the seat and the front fenders such that the operator mounts and dismounts the seat from behind the front fenders and the front drive wheels and not from over the cutting units. An armrest is carried adjacent one side of the seat and normally is disposed in an operational position in which the armrest blocks the seat and prevents the operator from mounting the seat from the one side of the seat. The armrest carries operational controls for lifting and lowering the cutting units and for starting and stopping the cutting units. The armrest is movable on the frame to a non-operational position in which the armrest clears the seat to allow the operator to mount the seat from the one side of the seat.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
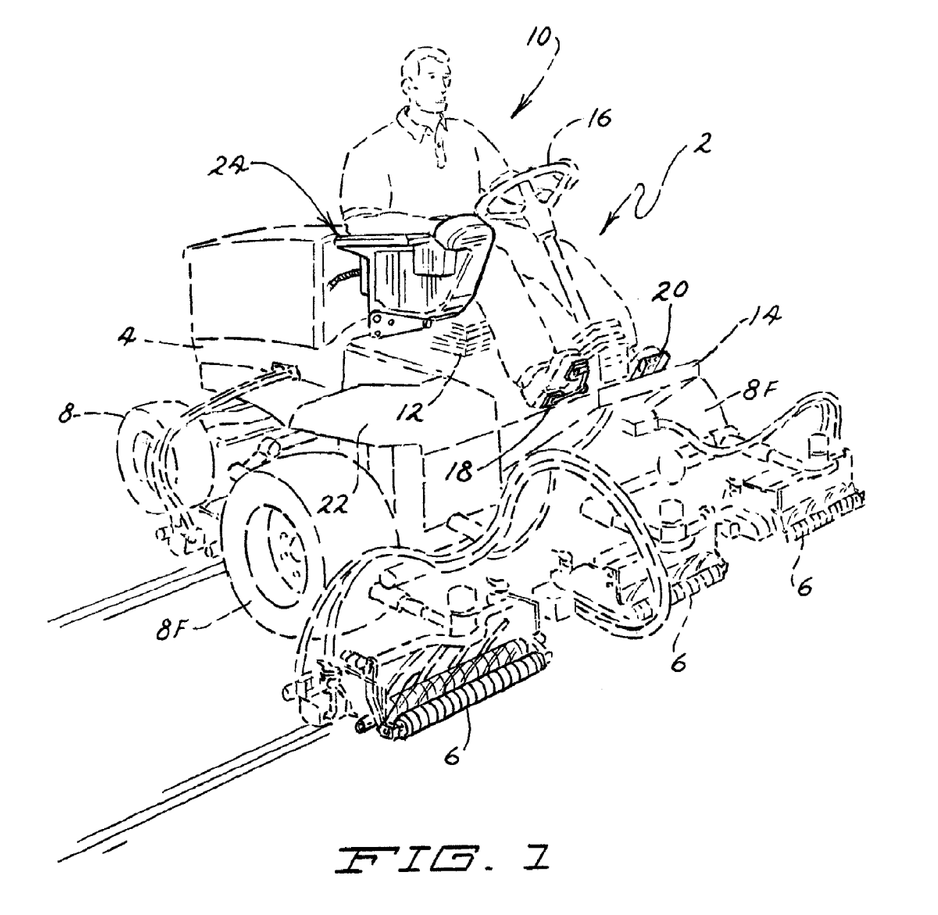
FIG. 1 is a perspective view of one embodiment of a riding mower according to this invention.

FIG. 1 illustrates one embodiment of a riding mower 2 according to this invention. Mower 2 includes a frame 4 supported for movement over the ground by a plurality of wheels 8. At least some wheels 8 are driven from a prime mover carried on frame 4 in order to propel mower 2 over the ground. A plurality of reel cutting units 6 are carried on frame 4 for mowing grass in an unbroken swath as mower 2 is driven over the ground. The type of cutting units 6 carried on frame 4 can vary from that shown herein.

Mower 2 includes an operator's station 10 having a seat 12 for carrying a seated operator. A floorboard 14 extends forwardly of seat 12. A steering wheel 16 is provided in advance of seat 12 to allow the operator to steer mower 2 as it moves over the ground. A forward and reverse traction pedal 18 is provided on one side of floorboard 14 to allow the operator to propel mower 2 in forward and reverse directions at a selected speed. A brake pedal 20 is provided on the other side of floorboard 14 to allow the operator to stop mower 2. Together, steering wheel 16, traction pedal 18 and brake pedal 20 comprise the drive controls, namely the controls the operator uses to drive and control the direction of movement of mower 2.

The operator mounts and dismounts operator's station 10 from behind one side of operator's station 10. Specifically, mower 2 contains front fenders 22 over the front drive wheels 8$_f$ that are generally adjacent each side of operator's station 10. Fenders 22 or that portion of frame 4 inboard of fenders 22 contain footholds to allow the operator to step up into operator's station 10 by ascending frame 4 from the rear of front drive wheels 8$_f$ and from the rear of fenders 22. No similar footholds are contained on frame 4 in advance of fenders 22 or in advance of operator's station 10. The only way for the operator to mount or dismount operator's station 10 is from the rear of front drive wheels 8$_f$ and fenders 22.

Figure 2:
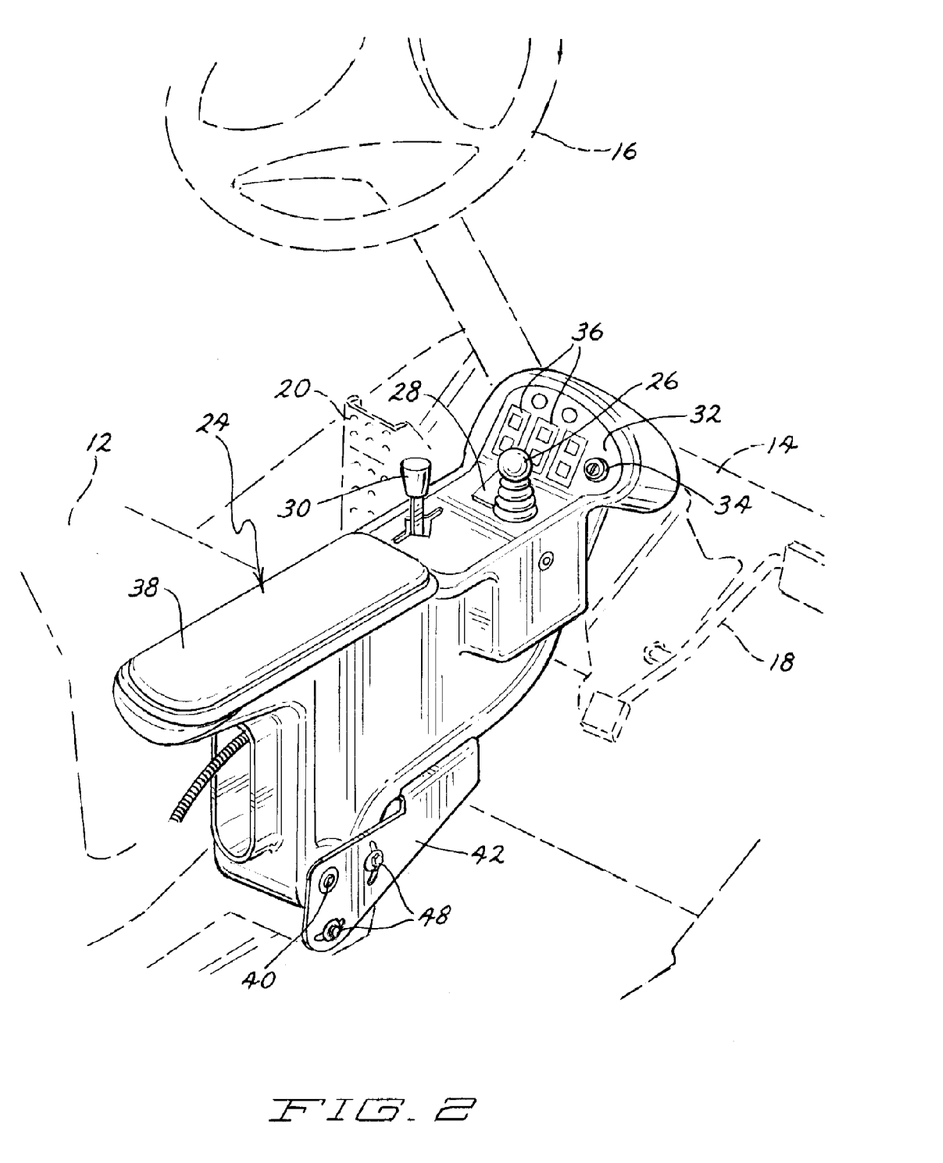
FIG. 2 is an enlarged perspective view of the operator's stations of the riding mower shown in FIG. 1, particularly illustrating the flip up armrest in its down and latched position.

An armrest 24 is provided adjacent one side of seat 12 at operator's station 10. The front of armrest 24 carries a plurality of operational controls. These controls include a joystick control 26 that can be pushed forward to lower cutting units 6 into an operational position in engagement with the ground or that can be pulled back to lift cutting units 6 into a transport position out of engagement with the ground, a rocker switch 28 that can be toggled to start and stop the operation of cutting units 6 by starting and stopping hydraulic flow (not shown) on mower 2, and a throttle 30 to vary the speed of the of the engine and of a hydraulic pump on the mower. These three controls 26, 28 and 30 plus a key switch 34 and a light switch represent the other controls needed by the operator to operate mower 2, namely the other controls except for the previously enumerated drive controls carried on floorboard 14 in advance of seat 12.

The front of armrest 24 in advance of the operational controls includes an upwardly extending, forwardly inclined display 32. Display 32 is angled or inclined to be easily viewable by an operator who is sitting on seat 12. Display 32 includes the key switch 34 for starting and stopping the operation of the prime mover and for powering the electrical system of mower 2. In addition, display 32 includes a plurality of indicators 36, such as LED's or the like, for indicating various operational conditions on mower 2. These indicators can include an hourmeter.

The rear of armrest 24 includes a padded cushion 38. Thus, when the operator is seated in seat 12 at operator's station 10, the operator's forearm can rest on cushion 38 of armrest 24 while the operator's hand grips and manipulates the various operational controls 26, 28 and 30. This leaves the operator's other hand free to grip steering wheel 16 to control the direction of travel of mower 2. Obviously, the traction and braking of mower 2 are controlled by the operator's feet using pedals 18 and 20.

Figure 3:
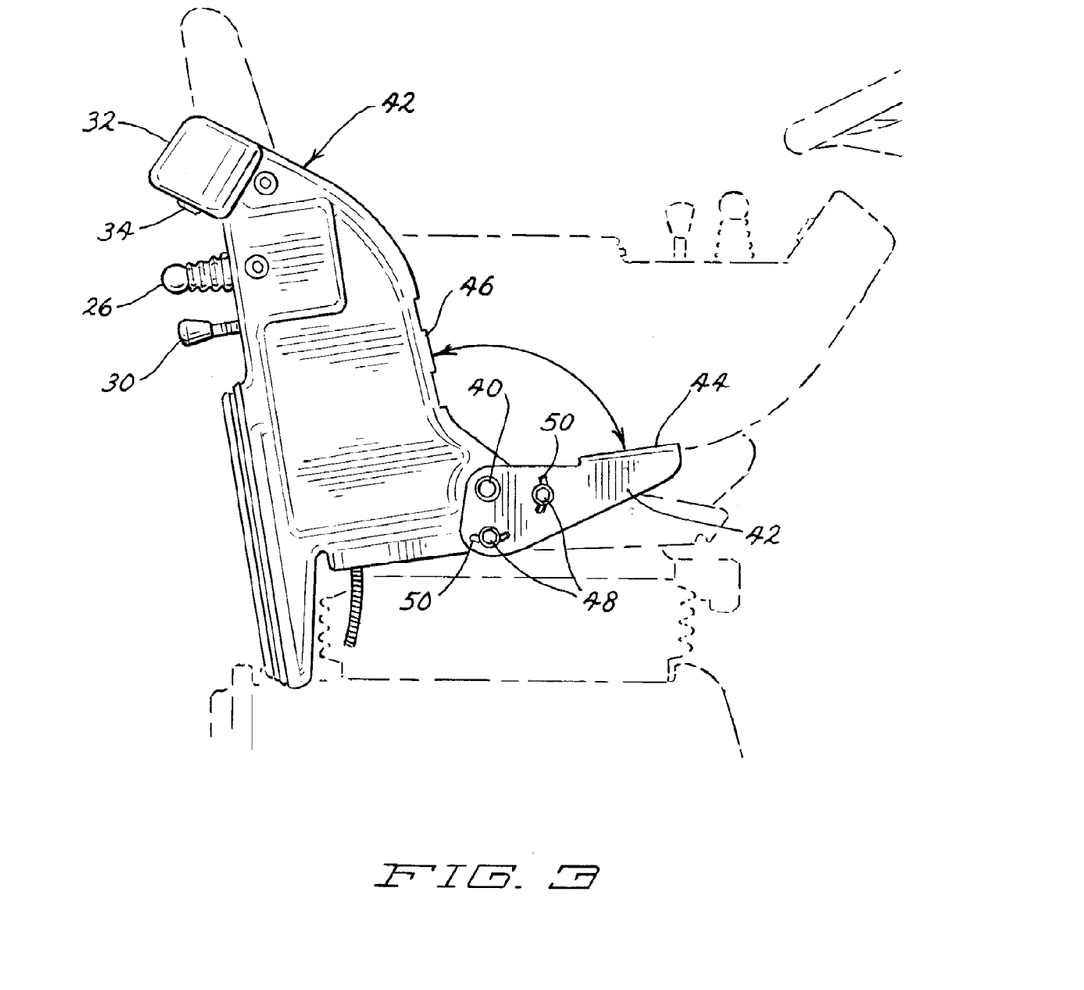
FIG. 3 is a side elevational view of the flip up armrest shown in FIG. 2, particularly illustrating the flip up armrest in its up and unlatched position in solid lines and in its down and latched position in phantom lines.
Figure 4:
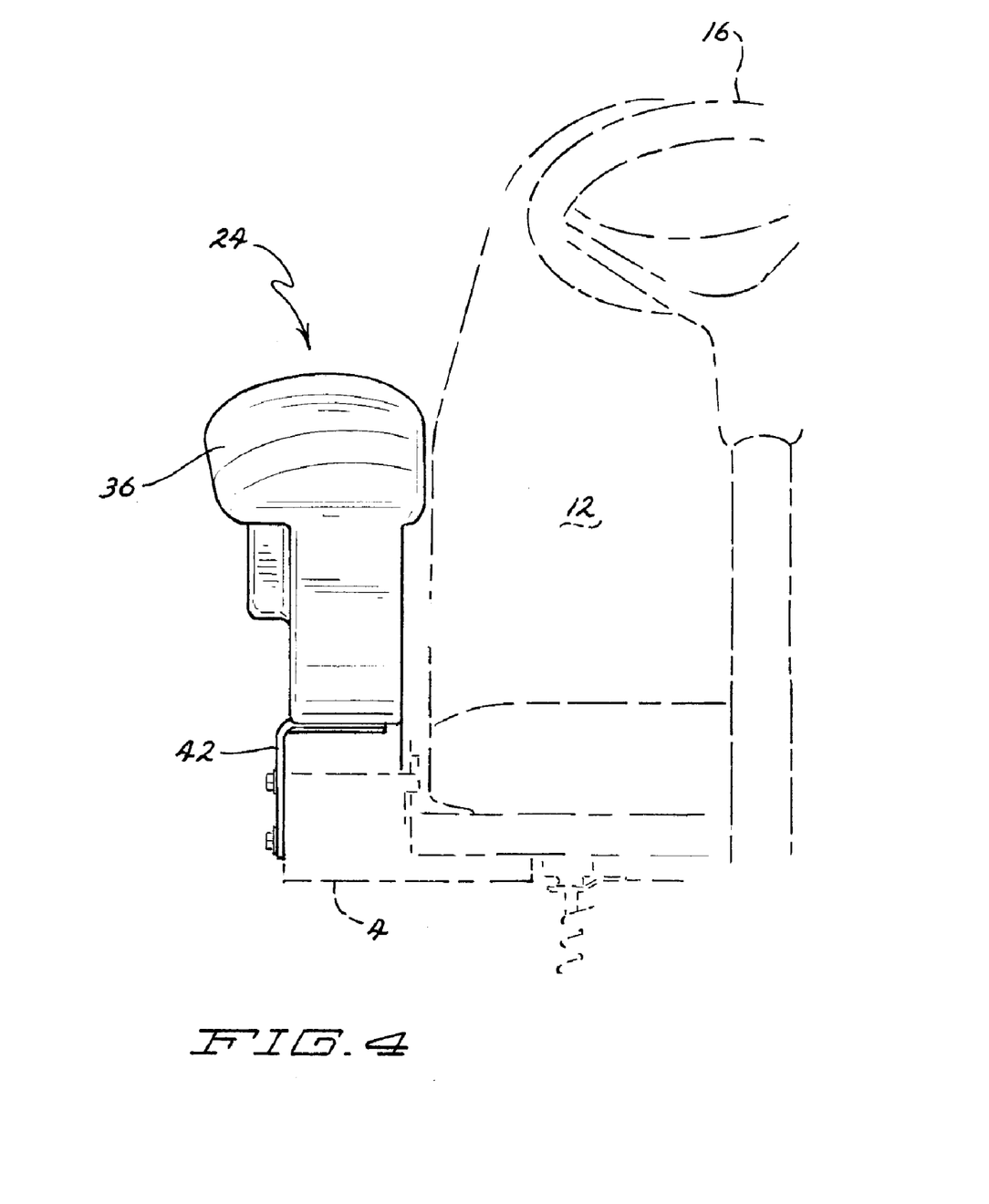
FIG. 4 is a front elevational view of the flip up armrest shown in FIG. 2.

Armrest 24 pivots on frame 4 of mower 2 about a substantially horizontal, transverse pivot pin 40. In addition, a latch 42 is pivotally arranged about the same pivot pin. Latch 42 includes a latch plate 44 that abuts against a flat portion 46 on the underside of armrest 24. Either latch plate 44 or flat portion 46 is magnetic to provide a magnetic holding force between armrest 24 and latch 42.

The magnetic holding force is strong enough to keep armrest 24 in engagement with latch plate 44 during normal operation of mower 2. However, the holding force is not strong enough to prevent the operator from overcoming the holding force by lifting up on armrest 24 and pulling armrest 24 upwardly away from latch 42. This act will break armrest 24 free of latch 42. Armrest 24 can then be pivoted upwardly about pivot pin 40 as shown in FIG. 3.

When latch 42 is engaged, armrest 24 is maintained in a generally horizontal operational position as shown in FIGS. 1 and 2. In this position, cushion 38 of armrest 24 and the front of armrest 24 are generally horizontal. However, the top of armrest 24 may be slightly inclined upwardly or downwardly depending upon the operator's preferences. Adjustment of the inclination of the top of armrest 24 is made by adjusting the angle of inclination of latch plate 44 relative to the horizontal.

Adjustment of the angle of inclination of latch plate 44 is done by pivotally adjusting latch 42 about pivot pin 40. This is accomplished by loosening various adjustment bolts 48 received in arcuate slots 50 in latch 42. This permits latch 42 to be pivoted relative to frame 4, at least as far as permitted by the length of slots 50, to allow the top of armrest 24 to be horizontal or inclined either upwardly or downwardly from horizontal. After the operator has adjusted latch 42 to a desired position, bolts 48 are tightened to fix the position of latch 42 on frame 4.

Armrest 24 is pivotal out of its generally horizontal operational position to a generally vertical storage position as shown in FIG. 3 merely by lifting up on armrest 24 with enough force to overcome the magnetic holding force of latch 42. When armrest 24 is in its vertical storage position, it opens up operator's station 10 so that the operator can mount mower 2 and reach seat 12 from the same side of mower 2 having armrest 24. Latch 42 is still in place, but latch 42 is short enough and small enough in height that it does not prevent an operator from easily climbing into operator's station 10. Once seated, the operator need only reach back and pull armrest 24 down to its generally horizontal operational position. In this position, the operational controls of mower 2 are at the operator's fingertips and the operator may commence operation of mower 2.

Thus, mower 2 of this invention provides access to operator's station 10 from either side of mower 2, even from the side that would normally be blocked by a fixed control console. Armrest 24 is no longer fixed, but can be easily pivoted out of the way. Once the operator is in place, armrest 24 can be lowered and latched in place for safe operation.

In addition, with a pivotal armrest 24 of this type, the entry and egress from operator's station 10 no longer need be over the front of mower 2. Instead, the operator can approach and leave operator's station 10 from behind fenders 22 and from behind front wheels $8_f$ of mower 2. This allows operator's station 10 to be placed at the very front of mower 2 with cutting units 6 lying immediately in front of and below operator's station 10.

Figure 5:
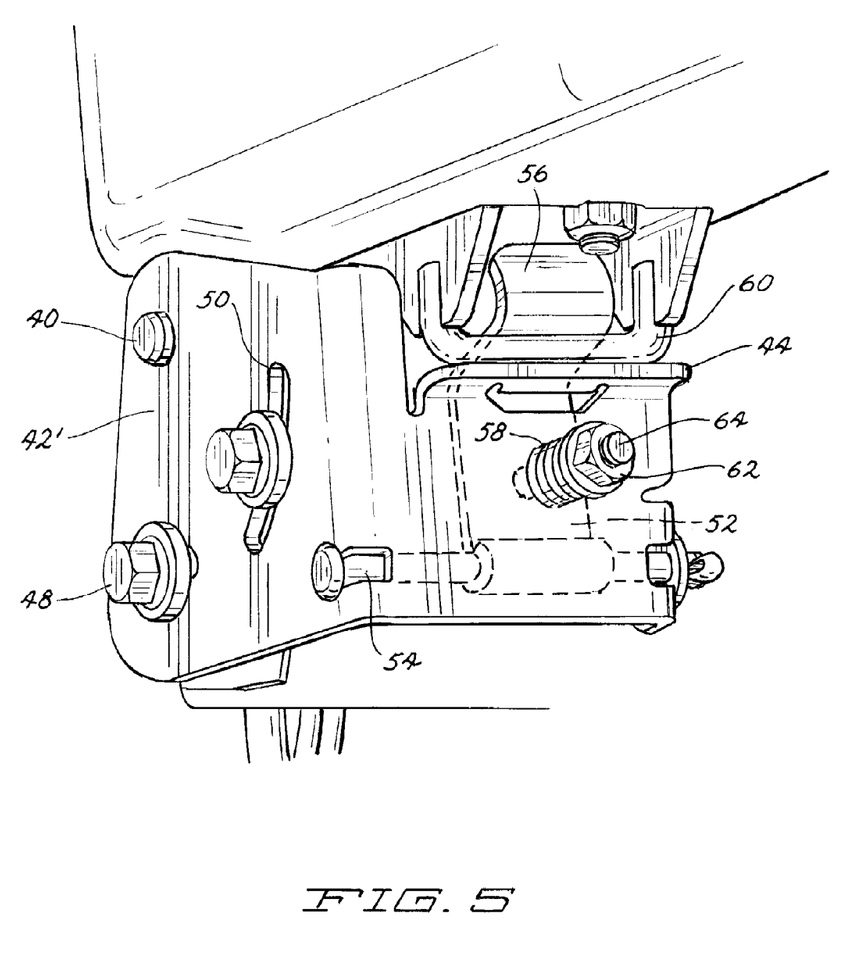
FIG. 5 is a perspective view of an alternative latch for the flip up armrest shown in FIG. 2.

FIG. 5 discloses an alternative latch 42' for use on mower 2. In this embodiment, a mechanical latch 42' is provided rather than a magnetic latch 42. A pivotal latch arm 52 is mounted for pivoting about a pivot pin 54 on latch 42'. Latch arm 52 has a forwardly extending V-shaped upper end 56 that is biased forwardly by a spring 58 to a position overlying latch plate 44. The underside of armrest 24 is provided with a fixed U-shaped latching bail 60.

In the operation of the mechanical latch 42' shown in FIG. 5, when armrest 24 is pivoted downwardly towards latch 42', bail 60 on the underside of armrest 24 will engage against the top of the V-shaped upper end 56 of latch arm 52. If the operator keeps forcing armrest 24 downwardly, the engagement of bail 60 with upper end 56 of latch arm 52 will cam latch arm 52 rearwardly until bail 60 clears upper end 56 of latch arm 52. At this point, armrest 24 can finish its downward movement with bail 60 then engaging latch plate 44. Upper end 56 of latch arm 52 will snap back over bail 60 due to the force from spring 58. This traps bail 60 on armrest 24 between upper end 56 of latch arm 52 and latch plate 44.

However, similarly to magnetic latch 42, the holding force provided by spring 58 is not so strong that the user cannot lift up on armrest 24 to overcome latch 42. When armrest 24 is forced upwardly, bail 60 again cams latch arm 52 rearwardly since bail 60 acts or pushes on the underside of the V-shaped upper end 56 of latch arm 52. Once bail 60 clears latch arm 52, armrest 24 can then be moved all the way to its generally vertical storage position. Pivotal latch arm 52 simply resets to its usual position under the force of spring 58.

The amount of the holding force of latch 42' can be adjusted by adjusting the compression on spring 58. This is done by threading an adjusting nut 62 carried on a post 64 fixed to latch arm 52 towards or away from the front of latch 42', thereby further compressing or releasing compression on spring 58. Thus, the operator can tailor how much force is required to break armrest 24 free of mechanical latch 42' to a level that suits the operator.

Figure 6:
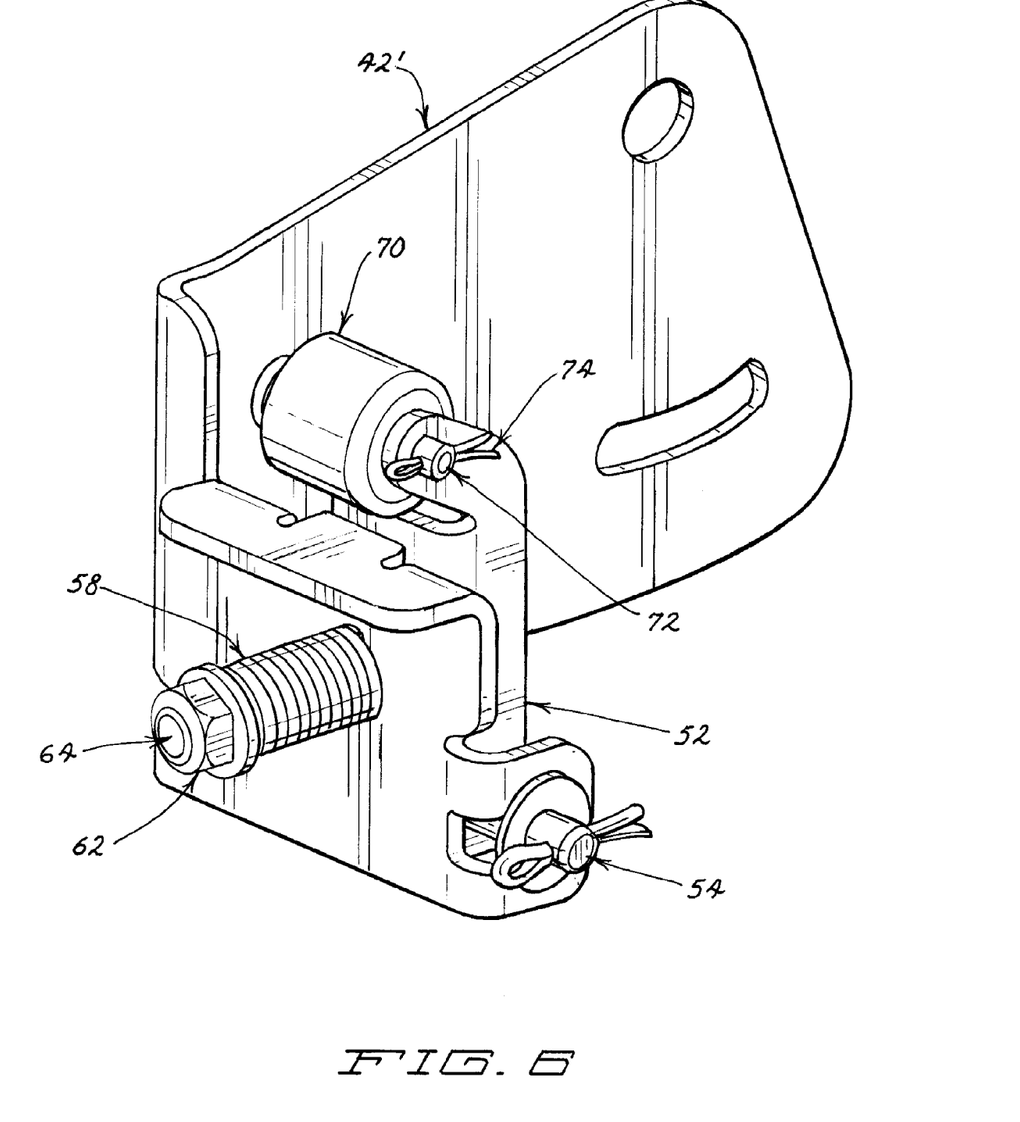
FIG. 6 is a perspective view of another alternative latch for the flip up armrest shown in FIG. 2.

Various modifications other than those described above will be apparent to those in the art. For example, FIG. 6 illustrates mechanical latch 42' in which the V-shaped upper end 56 of latch arm 52 is replaced with a rotatable roller 70. The upper end of latch arm 52 is now shaped as a yoke with roller 70 being rotatable thereon around pivot shaft 72. Cotter pin 74 will hold pivot shaft 72 in place. Roller 70 forms a smoother acting interface between latch arm 52 and bail 60 and eases the task of disengaging and engaging latch arm 52 and bail 60. Thus, this invention will be limited only by the appended claims.

We claim:
1. A mower, which comprises:
(a) a frame supported for movement over the ground by a plurality of wheels, wherein at least some of the wheels are driven to self-propel the frame over the ground;
(b) at least one cutting unit carried on the frame for mowing grass;
(c) an operator's station on the frame, the operator's station having a seat for carrying a seated operator;
(d) drive controls for controlling the speed and direction of movement of the frame over the ground, wherein the drive controls are arranged in advance of the seat;
(e) an armrest carried adjacent one side of the seat, the armrest carrying operational controls for controlling operation of the cutting unit, wherein the armrest is pivotally carried on the frame for movement between a lowered operational position in which ingress to and egress from the seat is blocked by the armrest and a flipped up, raised position in which ingress to and egress from the seat is permitted; and
(f) a releasable latch carried on the frame for releasably engaging with the armrest in the lowered operational position thereof to releasably retain the armrest in the lowered operational position thereof, wherein the latch engages the armrest with a holding force that is sufficient to keep the armrest engaged with the latch during operation of the mower but which can be overcome by the operator by pulling up on the armrest to be able to move the armrest between the operational and raised positions thereof such that the only action by the operator that is required to release the latch is the upward pull on the armrest by the operator, wherein the latch comprises:
  (i) a latch portion that is fixed to the frame during operation of the mower;
  (ii) a latch arm that pivots on the fixed portion of the latch relative to the fixed portion;
  (iii) a biasing member for biasing the latch arm relative to the fixed portion of the latch such that an upper end of the latch arm is normally disposed in an interfering position in which the upper end of the latch arm will be struck by an abutting portion of the armrest as the armrest is being pivoted into or out of the lowered operational position of the armrest, the biasing member acting on the latch arm providing the holding force of the latch, wherein the biasing member is a compression spring that is compressed against the fixed portion of the latch with the compression spring having an initial preload when the latch arm is in the interfering position thereof, wherein the compression spring is further compressed against the fixed portion of the latch when the pivotal latch arm is cammed out of the interfering position against the bias of the biasing member by motion of the abutting portion of the armrest;
  (iv) wherein the upper end of the latch arm has a to side that is shaped to engage with the abutting portion of the armrest as the armrest is being pivoted downwardly towards the lowered operational position in a manner that causes the latch arm to be cammed against the bias of the biasing member until the abutting portion of the armrest clears the upper end of the latch arm, the biasing member then causing the latch arm to snap back into an overlying relationship relative to the abutting portion of the armrest to releasably retain the armrest beneath the pivotal latch arm; and
  (v) wherein the upper end of the latch arm has an underside that is also shaped to engage with the abutting portion of the armrest as the armrest is being pivoted upwardly and is leaving the lowered operational position in a manner that causes the latch arm to be cammed against the bias of the biasing member until the abutting portion of the armrest clears the upper end of the latch arm, the armrest then being free to be completely raised into the flipped up, raised position and the biasing member then causing the latch arm to reset into the interfering position prior to the next time the armrest is lowered between the flipped up, raised position and the lowered, operational position thereof.

2. The mower of claim 1, wherein the armrest has a front and a rear.

3. The mower of claim 2, wherein the rear of the armrest carries a padded cushion and the front of the armrest carries the operational controls.

4. The mower of claim 3, wherein the front of the armrest carries an upwardly projecting display in advance of the operational controls, wherein the display includes various visual indicators for indicating various operational conditions on the mower.

5. The mower of claim 4, wherein the display is inclined forwardly as it projects upwardly from the armrest.

6. The mower of claim 2, wherein the armrest carries a display having various visual indicators for indicating various operational conditions on the mower.

7. The mower of claim 1, wherein the operational controls include a lift and lower control for raising and lowering the cutting units into and out of contact with the ground and a start/stop control for starting and stopping the operation of the cutting units.

8. The mower of claim 7, wherein the lift and lower control is a joystick control and the start/stop control is a rocker switch.

9. The mower of claim 1, wherein the drive controls include a steering wheel and a forward/reverse traction pedal.

10. The mower of claim 1, wherein the fixed portion of the latch abuts a portion of the armrest when the armrest is in the lowered operational position thereof to establish an angle of inclination of the armrest.

11. The mower of claim 10, wherein the latch is pivotally attached to the frame to adjust the angle of inclination of the armrest when the latch is pivotally adjusted relative to the frame.

12. The mower of claim 1, wherein the upper end of the latch arm has a horizontal V-shape having an apex, a first inclined wall extending upwardly away from the apex with the first inclined wall comprising the top side of the upper end of the latch arm, and a second inclined wall extending downwardly away from the apex with the second inclined wall comprising the underside of the upper end of the latch arm.

13. The mower of claim 1, wherein the upper end of the latch arm comprises a rotatable roller having a circumference with the roller rotating on the latch arm about a substantially horizontal axis, the top side of the latch arm comprising an arcuate portion of the circumference of an upper half of the roller and the underside of the latch arm comprising an arcuate portion of the circumference of a lower half of the roller.

14. The mower of claim 1, further including a rotatable member for adjusting the initial pre-load of the spring to thereby adjust the amount of the holding force provided by the latch on the armrest.

15. The mower of claim 14, wherein the rotatable spring adjusting member is exposed and is accessible to an operator for adjustment from a position below the armrest.

16. A mower, which comprises:
(a) a frame supported for movement over the ground by a plurality of wheels, wherein at least some of the wheels are driven to self-propel the frame over the ground;
(b) at least one cutting unit carried on the frame for mowing grass;
(c) an operator's station on the frame, the operator's station having a seat for carrying a seated operator;
(d) drive controls for controlling the speed and direction of movement of the frame over the ground, wherein the drive controls are arranged in advance of the seat;
(e) an armrest carried adjacent one side of the seat, the armrest carrying operational controls for controlling operation of the cutting unit, wherein the armrest is pivotally carried on the frame for movement between a lowered operational position in which ingress to and egress from the seat is blocked by the armrest and a flipped up, raised position in which ingress to and egress from the seat is permitted; and
(f) a releasable latch carried on the frame for releasably engaging with the armrest in the lowered operational position thereof to releasably retain the armrest in the lowered operational position thereof, wherein the latch engages the armrest with a holding force that is sufficient to keep the armrest engaged with the latch during operation of the mower but which can be overcome by the operator by pulling up on the armrest to be able to move the armrest between the operational and raised positions thereof such that the only action by the operator that is required to release the latch is the upward pull on the armrest by the operator, wherein the latch comprises:
  (i) a latch portion that is fixed to the frame during operation of the mower;
  (ii) a latch arm that pivots on the fixed portion of the latch relative to the fixed portion;
  (iii) a biasing member for biasing the latch arm relative to the fixed portion of the latch such that an upper end of the latch arm is normally disposed in an interfering position in which the upper end of the latch arm will be struck by an abutting portion of the armrest as the armrest is being pivoted into or out of the lowered operational position of the armrest, the biasing member acting on the latch arm providing the holding force of the latch;
  (iv) wherein the upper end of the latch arm has a top side that is shaped to engage with the abutting portion of the armrest as the armrest is being pivoted downwardly towards the lowered operational position in a manner that causes the latch arm to be cammed against the bias of the biasing member until the abutting portion of the armrest clears the upper end of the latch arm, the biasing member then causing the latch arm to snap back into an overlying relationship relative to the abutting portion of the armrest to releasably retain the armrest beneath the pivotal latch arm;
  (v) wherein the upper end of the latch arm has an underside that is also shaped to engage with the abutting portion of the armrest as the armrest is being pivoted upwardly and is leaving the lowered operational position in a manner that causes the latch arm to be cammed against the bias of the biasing member until the abutting portion of the armrest clears the upper end of the latch arm, the armrest then being free to be completely raised into the flipped up, raised position and the biasing member then causing the latch arm to reset into the interfering position prior to the next time the armrest is lowered between the flipped up, raised position and the lowered, operational position thereof; and (vi) wherein the upper end of the latch arm comprises a rotatable roller having a circumference with the roller rotating on the latch arm about a substantially horizontal axis, the top side of the latch arm comprising an arcuate portion of the circumference of an upper half of the roller and the underside of the latch arm comprising an arcuate portion of the circumference of a lower half of the roller.

\* \* \* \* \*

UNITED STATES PATENT AND TRADEMARK OFFICE
CERTIFICATE OF CORRECTION

| | |
|---|---|
| PATENT NO. | : 7,797,918 B2 |
| APPLICATION NO. | : 11/319007 |
| DATED | : September 21, 2010 |
| INVENTOR(S) | : Jeffrey T. Drake et al. |

It is certified that error appears in the above-identified patent and that said Letters Patent is hereby corrected as shown below:

Col. 6, Line 55, change "to side" to --top side--.

Signed and Sealed this

Ninth Day of November, 2010

David J. Kappos
*Director of the United States Patent and Trademark Office*